United States Patent [19]

Chamla et al.

[11] Patent Number: 4,879,359

[45] Date of Patent: Nov. 7, 1989

[54] PROCESS FOR POLYMERISING ETHYLENE USING A CHROMIUM OXIDE CATALYST

[75] Inventors: Claude Chamla, Marignane; John G. Speakman, Sausset les Pins, both of France

[73] Assignee: BP Chemicals Limited, London, England

[21] Appl. No.: 138,501

[22] Filed: Dec. 24, 1987

[30] Foreign Application Priority Data

Dec. 29, 1986 [FR] France ............................. 8618289

[51] Int. Cl.$^4$ ........................ C08F 2/34; C08F 4/22
[52] U.S. Cl. ................................ 526/105; 502/117; 526/352; 526/904; 526/901
[58] Field of Search ............................. 526/105, 106

[56] References Cited

U.S. PATENT DOCUMENTS 3,277,070 10/1966 Van Weynbergh et al. ........ 526/105
3,878,179 4/1975 Hogan ................................. 526/105

FOREIGN PATENT DOCUMENTS 175532 3/1986 European Pat. Off. ............ 526/904

Primary Examiner—Edward J. Smith
Attorney, Agent, or Firm—Brooks Haidt Haffner & Delahunty

[57] ABSTRACT

Process for polymerising ethylene, or copolymerising ethylene with an alpha-olefin, in the gas phase in the presence of a prepolymer/catalyst composition, the catalyst being an activated chromium oxide supported on a refractory oxide. The prepolymer is treated to an extraction with a solution comprising inert hydrocarbon and an organometallic compound, for example an alkylaluminum, prior to being dried and introduced into the gas phase (co) polymerisation. Prepolymer thus treated has improved properties in the dry state, for example improved flow.

8 Claims, No Drawings

PROCESS FOR POLYMERISING ETHYLENE USING A CHROMIUM OXIDE CATALYST

The invention relates to an improved process for the polymerisation of ethylene or the copolymerisation of ethylene and at least one other alpha-olefin in the gaseous phase by means of a catalyst comprising a chromium oxide compound, used in the form of a prepolymer.

It is known to prepare ethylene polymers or copolymers by a polymerisation or copolymerisation process in the gaseous phase using a prepolymer containing a chromium oxide based catalyst. Such a prepolymer is obtained in the course of a so-called prepolymerisation stage, comprising contacting the ethylene and possibly one or more other alpha-olefins with the solid chromium oxide based catalyst. It is then separated and isolated from the reaction medium so as to obtain a prepolymer in the form of a powder formed by particles immediately active in polymerisation. Before use, the prepolymer powder is advantageously subjected to one or more extraction operations by means of a liquid hydrocarbon, such as n-heptane, so as to eliminate more particularly waxes formed in the course of prepolymerisation. However, it has been found that during the extraction operations the prepolymer particles tend to become agglomerated together and to adhere to the walls of the container in which these operations are performed. Such phenomena disturb not only the actual wax-extracting operations, but also the subsequent operations for drying and recovering the prepolymer powder. Moreover, a prepolymer powder thus prepared may have poor dry flow properties which more particularly disturb its use in polymerisation in the gaseous phase. More particularly, the serious consequences are familiar which result from an irregular feed of catalyst or prepolymer to a polymerisation reactor in the gaseous phase, more particularly a fluidised bed reactor, in which there may be a considerable increase in the risks of the formation of hot spots and agglomerates of molten polymer.

It has now been found that these difficulties can be obviated and that it is possible to prepare in satisfactory industrial conditions a prepolymer powder which is easy to manipulate and has outstanding dry flow properties. More particularly, such a prepolymer powder enables a polymerisation or copolymerisation reaction of ethylene in the gaseous phase to be performed in particularly stable conditions.

The present invention therefore relates to a process for the polymerisation of ethylene or the copolymerisation of ethylene and at least one other alpha-olefin in the gaseous phase, in the presence of a catalyst comprising a chromium-oxide compound supported on a refractory oxide and activated by a thermal treatment in a non-reducing atmosphere, the catalyst being used in the form of a powder of a prepolymer of ethylene and optionally at least one other alpha-olefin, the process being characterised in that the prepolymer powder is subjected before use to at least one extraction operation comprising:

(1) contacting the prepolymer in an inert atmosphere with an inert hydrocarbon liquid and one or more organometallic compounds or an addition complex of at least two organometallic compounds, having the general formula $$RMR'_{(n-1)}$$

wherein M is a metal selected from aluminium, magnesium, zinc or boron, R is a hydrogen atom or an alkyl group comprising 1 to 12 carbon atoms or an alcoholate group comprising 1 to 6 carbon atoms, R' is an alkyl group comprising 1 to 12 carbon atoms and n is an integer corresponding to the valency of the metal M, the quantity of the organometallic compound used being such that the number of mg atoms of metal M is between 0.05 and 50 per kg of prepolymer and (2) separating the liquid phase of the resulting mixture.

It is important for the prepolymer extraction operation using a hydrocarbon liquid to be performed in the presence of an adequate quantity of the previously defined organometallic compound, so as to prevent the agglomeration of the prepolymer particles with one another and their adherence to the walls of the container in which the operation is performed. It has also been observed that when the organometallic compound is used not in the course of the prepolymer extraction operation, but in the preliminary stage, more particularly during the prepolymerisation stage, the effects required during the prepolymer extraction are not achieved, and the resulting prepolymer powder lacks the required quality.

The invention therefore results from a combination of two means, namely:

(1) the contacting of the prepolymer with the hydrocarbon liquid and the organometallic compound, (2) such contacting being performed in the course of a prepolymer extraction operation, with a view to obtaining a prepolymer powder suitable for being used in a polymerisation process in the gaseous phase.

The organometallic compounds or the additional complexes of at least two organometallic compounds are advantageously soluble in the hydrocarbon liquid used during the prepolymer extraction operation and are preferably dissolved in such liquid in the conditions of such operation.

The organometallic compounds, $RMR'_{(n-1)}$, responding to the preceding definition, are preferably chosen from a trialkyl aluminium, a hydride and an alcoholate of dialkyl aluminium, a dialkyl magnesium and a dialkyl zinc. It is more particularly possible to use triethylaluminium, triisobutylaluminium, tri-n-hexylaluminium, tri-n-octylaluminium, diethylaluminium hydride, diethylalumiumethylate, ethybutylmagnesium, dibutylmagnesium, dihexylmagnesium or diethylzinc.

It is also possible to use an addition complex of at least two of the organometallic compound $RMR'_{(n-1)}$, such as addition complexes between a trialkylaluminium and a dialkylmagnesium, for example, the complexes marketed under the trademark "MAGA-LA" ® by Texas Alkyls (United States of America). It is more particularly possible to use an addition complex between dibutylmagnesium and triethylaluminium.

The hydrocarbon liquid used during the prepolymer extraction operation must be inert chemically with respect to the chromium oxide based catalyst, and also the organometallic compounds. It is preferred to use a hydrocarbon liquid formed by one or more saturated aliphatic hydrocarbons, such as n-hexane or n-heptane.

The quantity of organometallic compound, $RMR'_{(n-1)}$ used in the course of an extraction operation is between 0.05 and 50, preferably between 0.1 and 10 milligram-atoms of metal M per kilogram of prepolymer. It has been surprisingly found that the majority, if not all the organometallic compound used during the extraction operation is retained by the prepolymer. This retention phenomenon tends to show that the organometallic compound is fixed on the prepolymer during the course of the extraction operation and contributes by its interaction towards improving the quality of the prepolymer powder. It has also been observed that the use of an excessive quantity of organometallic compound during the extraction operation is harmful to the quality of the prepolymer powder, more particularly making it sticky.

The quantity of hydrocarbon liquid used during an extraction operation must be enough to obtain a suitable dispersion of organometallic compound over all the prepolymer particles, and to enable an appreciable quantity of waxes formed during the prepolymerisation stage to be extracted, such waxes being mainly formed by polymer or copolymer soluble in n-hexane at 60° C. In practice the quantity of hydrocarbon liquid used in each extraction operation may be between 0.5 and 50 litres per kilogram of prepolymer.

The conditions of contacting the prepolymer with the hydrocarbon liquid and the organometallic compound must be such that the catalytic activity of the prepolymer is maintained. In practice contacting is performed in an inert atmosphere, such as nitrogen in a container for example, the reactor in which the prepolymerisation stage was performed. The contacting can be performed by various methods, more particularly by adding the hydrocarbon liquid and the organometallic compound to the prepolymer taking the form of a powder or a suspension in a liquid hydrocarbon. Preferably the organometallic compound is first of all mixed and dissolved in the hydrocarbon liquid.

Contacting is advantageously performed at a temperature of between 20° and 110° C., preferably between 40° and 90° C., so as to encourage the contact of the organometallic compound and the prepolymer and facilitate the dissolution of the waxes in the hydrocarbon liquid. It is preferable for the hydrocarbon liquid to be first of all heated to the temperature required for contacting. Moreover, such contacting is preferably performed with agitation and for a period long enough to homogeneously disperse the organometallic compound in the prepolymer and dissolve an appreciable quantity of waxes. This period is generally of the order of a few minutes to a few hours, preferably between 10 and 60 minutes.

Extraction is performed following contacting, by separating and eliminating the liquid phase of the resulting mixture. The conditions of this operation must enable the prepolymer to maintain its catalytic activity in polymerisation. It is performed in an inert atmosphere, by any known means, such as filtration or decantation, of the prepolymer followed by the elimination of the supernatant liquid phase.

The prepolymer extraction operation as described according to the invention can be restarted several times, more particularly until the prepolymer has a content of polymer or copolymer soluble in n-hexane at 60° C. which is lower than or equal to 2% by weight.

The prepolymer is finally obtained, after complete separation of the hydrocarbon liquid, in the form of a powder preferably substantially free from hydrocarbon liquid. Such separation between the prepolymer and the hydrocarbon liquid is performed in an inert atmosphere and may include various known methods, such as drying in partial vacuum or by means of an inert hot gas flow.

The prepolymer advantageously takes the form of a powder formed by particles having a mean diameter by mass of between 40 and 1000 microns, preferably between 80 and 500 microns, and more particularly still between 100 and 400 microns.

The prepolymer used according to the invention is prepared during a prepolymerisation stage which consists in contacting the chromium oxide based catalyst with ethylene, alone or mixed with at least one other alpha-olefin preferably containing 3 to 12 carbon atoms. Preferably propylene, 1-butene, 1-hexene, 4-methyl-1-pentene or 1-octene can be used as an alpha-olefin mixed with ethylene. Prepolymerisation can be performed either in suspension in a liquid hydrocarbon medium, or in the gaseous phase, a reactor having a fluidised bed and/or a mechanical stirring system, at a temperature lower than that at which the prepolymer particles begin to soften and form agglomerates, preferably a temperature between 40 and 115° C. Prepolymerisation is performed until the prepolymer contains $4 \times 10^{-5}$ to 3, preferably $10^{-3}$ to $10^{-1}$ milligram-atoms of chromium per gram.

Prepolymerisation can be advantageously performed in the presence of at least one organometallic compound of a metal of groups I to III of the Periodic Table of Elements. The organometallic compound is preferably selected from the organoaluminium, organomagnesium and organozinc compounds or a mixture of such compounds. The quantity of organometallic compound used in the prepolymerisation can be such that the atomic ratio between the quantity of metal of such organometallic compound and the quantity of chromium of the catalyst is between 0.01 and 30, preferably between 0.1 and 1.

Prepolymerisation can also be performed in the presence of hydrogen, to control the molecular weight of the prepolymer produced, more particularly if it is obtained in the presence of the organometallic compound.

The catalysts used according to the invention are obtained by a large number of known processes, more particularly by those in which, in a first stage, a chromium compound such as chromium oxide, generally having the formula $CrO_3$ or a chromium compound which can be converted by calcination into chromium oxide, such as, for example, a chromium nitrate or a chromium sulphate, an ammonium chromate, a chromium carbonate, acetate or acetyl acetate, or a tertiarybutyl chromate is associated with a granular support on refractory oxide base such as, for example, silica, alumina, zirconium oxide, thorium oxide, titanium oxide or mixtures or coprecipitates of two or more of such oxides. In a second stage the chromium compound thus associated with the granular support is subjected to an activation operation by thermal treatment at a temperature of at least 250° C. and at most equal to the temperature at which the granular support begins to sinter; the thermal treatment temperature is generally between 250° and 1200° C., and preferably between 350° and 1000° C. The thermal treatment is performed in an non-reducing atmosphere, preferably in an oxidising atmosphere, generally formed by a gaseous mixture comprising oxygen, such as, for example, air. The thermal treatment can last for between 5 minutes and 24 hours, preferably between 30 minutes and 15 hours, so that on completion of the treatment the chromium compound is at least partially in the hexavalent state. The content by weight of chromium in the catalyst obtained is generally between 0.05 and 30%, and preferably between 0.1 and 3%.

The catalyst activation operation can be performed in the presence of flourine compounds selected from hexafluorotitanate, tetrafluoroborate and ammoniumhexafluorosilicate and if necessary in the presence of a titanium compound chosen from the titanium alcoholates. The contents by weight of fluorine and titanium of these catalysts can be between 0.05 and 8% and between 0.1 and 20% respectively.

The process for the polymerisation or copolymerisation of ethylene and at least one other alpha-olefin is performed in the gaseous phase, by contacting the prepolymer powder, as prepared according to the invention, with the or each olefinic monomer.

Polymerisation or copolymerisation is performed by known techniques, more particularly in a fluidised bed reactor. In this particular case, gaseous mixture comprising ethylene and possibly at least one other alpha-olefin to be polymerised circulates in a rising current through the fluidised bed, comprising polymer or copolymer particles in the course of formation. The ethylene and possibly at least one other alpha-olefin is introduced into the fluidised bed reactor at a temperature such that the reaction medium is at a temperature of at least 50° C. and advantageously at least 80° C., but lower than the temperature at which the polymer or copolymer particles begin to soften and form agglomerates, preferably below 115° C.

The fluidisation speed of the gaseous mixture is preferably relatively high, so as to ensure satisfactory homogenisation of the fluidised bed without having to use any other means of homogenising the fluidised bed, more particularly a mechanical means, and so that the heat given off by polymerisation is efficiently dissipated and the polymerisation yield is enhanced. The fluidisation speed is generally between about 40 and 120 cm/seconds, preferably between 50 and 100 cm/seconds. As it passes through the fluidised bed, only a proportion of the olefinic monomers is polymerised in contact with the polymer or copolymer particles in course of growth. That fraction of the olefinic monomers which has not reacted leaves the fluidised bed and passes through a cooling system adapted to dissipate the heat evolved during the reaction, before being recycled in the fluidised bed reactor by a compressor.

The total pressure in the reactor can be close to atmospheric pressure, but is preferably higher, so as to increase the polymerisation speed. It can be between 0.5 and 4 MPa, and is preferably between 0.8 and 3 MPa.

In order to control and more particularly reduce the mean molecular weight of the polymers or copolymers produced, the polymerisation temperature must be increased. It is also possible to add to the gaseous mixture flowing in the fluidised bed reactor a quantity of hydrogen such that the hydrogen/ethylene and other possible alpha-olefin molar ratio is between 0 and 5, and preferably between 0.1 and 1.

The gaseous mixture can also comprise an inert gas in a quantity such that the inert gas/ethylene and possibly at least one other alpha-olefin molar ratio is between 0 and 5, and preferably between 0.1 and 2. The inert gas can be selected from nitrogen, methane, ethane, propane or a mixture of such gases. More particularly it enables the dissipation of the reaction heat to be substantially improved and polymerisation kinetics to be modified favourably.

The gaseous mixture can contain in addition to ethylene one or more other alpha-olefins preferably comprising 3 to 12 carbon atoms, preferably selected from propylene, 1-butene, 1-hexene and 4-methyl-1-pentene and 1-octene.

Advantageously, to increase the yield of the polymerisation or copolymerisation, an organometallic compound of a metal of groups I to III of the Periodic Table of Elements, more particularly an organoaluminium, organomagnesium or organozinc compound can be directly introduced into reactor independently of the prepolymer. In that case it is preferable for the organometallic compound to be used in the form of a solution in a saturated aliphatic hydrocarbon comprising, for example, 4 to 7 carbon atoms, so as to facilitate its dispersion in the polymerisation medium, and also its contacting with the prepolymer introduced in another way. The resulting ethylene polymers or copolymers generally contain less than 10 ppm (parts per million by weight) of chromium.

The process according to the invention therefore enables a wide range of ethylene polymers and copolymers to be produced in the gaseous phase in highly satisfactory and highly stable conditions, by using an improved prepolymer containing a chromium oxide based catalyst. The prepolymer takes the form of a powder which is not only formed by particles immediately active in polymerisation, but also has outstanding flow properties. As a result the supply of prepolymer to the polymerisation reactor in the gaseous phase is regular and enables the polymerisation or copolymerisation reaction to be performed in stable conditions.

DETERMINATION OF THE FLOWABILITY OF A PREPOLYMER POWDER

The flowability of a prepolymer powder is determined using a series of eight hoppers having the form of a truncated cone of revolution of vertical axis and having an apex angle of 30° oriented downwards. The hoppers differ from one another by the diameter of the minor circular base, corresponding to the bottom opening of the hopper, such diameter being equal to 5, 10, 15, 20, 25, 30, 35 and 40 mm, the height of the truncated cone being 107, 100, 90, 80, 73, 65, 58 and 52 mm respectively.

The bottom opening of the hopper is closed by a sheet of glass. The prepolymer powder which has been previously aerated and decompacted is poured through the top opening into the hopper, without compressing the powder. When the hopper is full, the powder is made flush with the level of the top opening of the hopper by horizontally sweeping the surplus quantity of poured powder. Then the sheet of glass closing the bottom opening is withdrawn and it can be seen whether or not the powder flows freely.

The flowability of a prepolymer powder is determined by the smallest value of the diameter of the bottom opening through which the powder can flow freely. According to this method, a prepolymer powder is considered to have good flowability if it passes freely through the bottom opening of a hopper having a diameter less than or equal to 20 mm.

The following non-limitative examples illustrate the invention.

EXAMPLE 1

(a) Preparation of a catalyst

A catalyst powder marketed by Joseph Crosfield and Sons (Warrington, Great Britain) under the tradename "EP 118" ® was subjected to a thermal treatment at 800° C. in a fluidised bed reactor for 5 hours, using a dry air flow. The catalyst, formed by chromium oxide supported on a porous silica, contained about 1% by weight of chromium. After the thermal treatment the catalyst powder thus activated was cooled to ambient temperature (20° C.) and kept in a nitrogen atmosphere for its preservation.

(b) Preparation of a prepolymer powder 2 litres of n-hexane, 20 g of previously prepared catalyst and 1.92 millimole of tri-n-octylaluminium (TnOA) was introduced in a nitrogen atmosphere into a 5 litre stainless steel reactor having a stirring system rotating at 500 rpm. The suspension was heated to 75° C. and ethylene was introduced into the reactor at a flow rate of 90 g/h for 2 hours and 20 minutes. Then the prepolymer suspension was kept at 75° C. with stirring for 15 minutes, so as to consume the maximum amount of unreacted ethylene. The reactor was then degassed and cooled to 60° C. Stirring was stopped to allow the prepolymer to be decanted and about 1.5 litres of the supernatent liquid phase was removed.

The prepolymer extraction operation then started by the introduction into the reactor of 1.5 litres of a solution of TnOA in n-hexane which had previously been heated to 60° C. containing 0.48 milligram-atoms of aluminium. The prepolymer suspension kept at 60° C. was stirred for 20 minutes. Then stirring was stopped so as to enable the prepolymer to be decanted. Then a volume of the supernatent liquid phase equal to 1.5 litres was removed. The extraction operation was restarted twice. It was found that during these extraction operations no prepolymer deposit had formed on the inside walls of the reactor.

Finally 0.96 millimole of TnOA was added to the prepolymer, which was then dried at 70° C. in a nitrogen flow. The result was a prepolymer which took the form of a powder formed by particles immediately active in polymerisation. The powder contained no agglomerates and had excellent flowability: by the method described above, the powder flowed freely through an opening 100 mm in diameter.

(c) Polymerisation of ethylene in the gaseous phase 200 g of an inert anhydrous polyethylene powder originating from a preceding operation was introduced as charge powder under nitrogen into a 2.6 litre stainless steel reactor having a stirring system rotating at 350 rpm and heated to 100° C. Then 0.125 millimole of triethylaluminium (TEA), was introduced into the reactor, and 15 minutes later a quantity of the prepolymer powder prepared previously corresponding to 0.025 milligram-atom of chromium, and a quantity of hydrogen corresponding to a partial hydrogen pressure of 0.02 MPa. Ethylene was then introduced into the reactor until a total pressure of 0.014 MPa was reached, which was kept constant throughout polymerisation by the addition of ethylene. After 2 hours and 20 minutes of polymerisation the reactor was cooled to ambient temperature (20° C.) and degassed.

It was found that 400 g of polyethylene had been produced. The polymer took the form of a powder formed by particles having a mean diameter by mass of 675 microns. The powder was free from agglomerates and had an apparent volumetric mass at rest (bulk density) of 0.37 g/cm$^3$. The resulting polyethylene contained 3 ppm of chromium. It had melt indices, measured at 190° C. under loads of 8.5 kg and 2.16 kg of 1.45 and 12.5 g/10 minutes respectively.

EXAMPLE 2 (FOR COMPARISON)

Operations were performed exactly as in Example 1, except that pure n-hexane was substituted for the solution of TnOA in n-hexane during the prepolymer extraction operations. It was found that even as soon as the first extraction operation, prepolymer become agglomerated and adhered to the inside walls of the reactor, so that after the three successive extraction operations the prepolymer flowed out of the reactor with difficulty. After drying, a prepolymer powder was obtained which had poor flowability: according to the method described above, the prepolymer powder could not flow freely through an opening having a diameter equal to or less than 20 mm.

EXAMPLE 3

(a) Preparation of a catalyst

A catalyst powder marketed by Joseph Crosfield and Sons (Warrington, Great Britain) under the tradename "SD 200" ® was subjected to a thermal treatment at 525° C. in a fluidised bed reactor for 5 hours, using a dry air flow. This catalyst, comprising chromium oxide supported on a porous silica, contained about 0.36% by weight of chromium. After the thermal treatment the catalyst powder thus activated was cooled to ambient temperature (20° C.) and kept in a nitrogen atmosphere for its preservation.

(b) Preparation of a prepolymer powder 500 litres of n-hexane heated to 75° C., 95.4 millimoles of dibutylmagnesium and 5.7 kg of the previously prepared catalyst were introduced under a nitrogen atmosphere into a 100 litre stainless steel reactor having a stirring system rotating at 140 rpm. Then ethylene was introduced at a flow rate of 15 kg/h for 3 hours and 30 minutes. Then the prepolymer suspension was kept at 75° C. with stirring for 30 minutes, to consume as large a quantity as possible of the unreacted ethylene. The reactor was degassed, then cooled to 60° C. Agitation was stopped to allow the prepolymer to be decanted and about 30 litres of the supernatent liquid phase were removed.

The prepolymer extraction operation then began by the introduction into the reactor of 300 litres of a solution of dibutylmagnesium in n-hexane, previously heated to 60° C., containing 47.7 milligram-atoms of magnesium. The prepolymer suspension kept at 60° C. was stirred for 30 minutes. Then stirring was stopped so as to enable the prepolymer to be decanted. Then a volume of the supernatent liquid phase equal to 300 litres was removed. The extraction operation was restarted twice. It was found that during these extraction operations no prepolymer deposit had formed on the inside walls of the reactor.

The reactor was cooled to ambient temperature (20° C.) and finally 95.4 millimoles of dibutylmagnesium were added to the prepolymer. The prepolymer was then dried at 70° C. under a flow of nitrogen. The result was a prepolymer powder consisting of particles immediately active in polymerisation and having a mean diameter by mass of 225 microns. The powder contained no agglomerates and had a bulk density of 0.38 g/cm$^3$. It moreover had excellent flowability, since by the method described above the powder flowed freely through an opening 10 mm in diameter.

(c) Polymerisation of ethylene in the gaseous phase 70 kg of an inert anhydrous polyethylene powder originating from a preceding operation was introduced as a charge powder into a fluidised bed reactor 45 cm in diameter under a nitrogen atmosphere. Then a gaseous mixture heated to 104° C. and formed by hydrogen, ethylene and nitrogen was introduced into the reactor and driven at an ascending speed of 80 cm/second. The partial pressures (pp) of the constituents of the mixture were:

pp hydrogen=0.4 MPa
pp ethylene=1.0 MPa
pp nitrogen=0.6 MPa

Then 0.7 litre of a molar solution of triethylaluminium (TEA) in n-hexane was introduced into the reactor and the reactor was maintained in these conditions for 1 hour. Then the previously prepared prepolymer was introduced into the reactor in a sequenced manner, at the rate of 10 g every 5 minutes.

About 3 hours after the start of introduction of the prepolymer, 9 ml/h of a molar solution of dibutylmagnesium in n-hexane was continuously and directly introduced into the reactor.

It was found that after a period of stabilising the polymerisation conditions, 4 kg/h of a polyethylene powder free from agglomerates and having a chromium content of 6.5 ppm, a density of 0.951 and an index of fluidity, measured at 190° under a charge of 8.5 kg, equal to 1.43 g/10 minutes were regularly obtained.

EXAMPLE 4 (FOR COMPARISON)

Operations were performed exactly as in Example 3, except that during the prepolymer extraction operations, pure n-hexane was substituted for the solution of dibutylmagnesium in n-hexane. It was found that from the very first extraction operation, prepolymer became agglomerated and adhered to the inside walls of the reactor. On termination of these three successive extraction operations, the majority of the prepolymer remained agglomerated inside the reactor. After drying, a prepolymer was obtained, partly in the form of powder and partly in the form of agglomerates sticking to the reactor walls. The prepolymer powder recovered had poor flowability: determined by the method described previously, it flowed freely through only an opening of 40 mm in diameter. The prepolymer powder could not be regularly introduced into a fluidised bed reactor.

We claim:

1. A process for the polymerisation of ethylene or the copolymerisation of ethylene and at least one other alpha-olefin in the gaseous phase, in the presence of a catalyst comprising a chromium oxide compound supported on silica, alumina, or mixtures thereof, or coprecipitates thereof, and activated by a thermal treatment in a non-reducing atmosphere at a temperature of at least 250° C. and at most equal to the temperature at which the support begins to sinter, the catalyst being used in the form of a powder of a prepolymer prepared during a prepolymerisation stage consisting essentially of contacting the catalyst with ethylene, alone or mixed with at least one other alpha-olefin, in the presence of an organometallic compound selected from organoaluminum, organomagnesium and organozinc compounds or a mixture of these compounds, until the prepolymer contains per gram $4 \times 10^{-5}$ to 3 milligram-atoms of chromium, the process being characterised in that the prepolymer powder is subjected after the prepolymerisation and before use to at least one extraction operation comprising:

(1) contacting at a temperature of between 20 and 110° C. and with agitation the prepolymer in an inert atmosphere with a solution comprising:
  (a) an inert hydrocarbon liquid in a quantity between 0.5 and 50 liters per kilogram of prepolymer and
  (b) one or more organometallic compounds or an addition complex of at least two organometallic compounds, being soluble in the inert hydrocarbon liquid, and having the general formula:

$$RMR'_{(n-1)}$$

wherein M is a metal selected from aluminum, magnesium, zinc or boron, R is a hydrogen atom or an alkyl group comprising 1 to 12 carbon atoms or an alcoholate group comprising 1 to 12 carbon atoms and n is an integer corresponding to the valency of the metal M, the quantity of the organometallic compound used being such that the number of milligram-atoms of metal M is between 0.05 and 50 per kg of polymer, and (2) separating and eliminating the liquid phase of the resulting mixture from the prepolymer in an inert atmosphere by filtration or decantation of the prepolymer and by drying the prepolymer in partial vacuum or by means of an inert hot gas flow, so that the prepolymer is obtained in the form of a powder substantially free from hydrocarbon liquid.

2. A process according to claim 1, characterised in that the organometallic compound used during the extraction operation is selected from a trialkyl aluminum, a hydride and an alcoholate of dialkyl aluminum, a dialkylmagnesium and a dialkyl zinc.

3. A process according to claim 1, characterised in that the addition complex of at least two organometallic compound used during the extraction operation is an addition complex between a trialkylaluminum and a dialkylmagnesium.

4. A process according to claim 1, characterised in that the hydrocarbon liquid is formed by one or more saturated aliphatic hydrocarbons.

5. A process according to claim 1, characterised in that during the extraction operation, the contacting is performed by adding (a) the hydrocarbon liquid and (b) the organometallic compound to the prepolymer which is in the form of a powder or a suspension in a liquid hydrocarbon.

6. A process according to claim 1, characterised in that the organometallic compound used during the extraction operation is previously mixed and dissolved in the hydrocarbon liquid.

7. A process according to claim 1, characterised in that the hydrocarbon liquid used in the extraction operation is previously heated to the temperature required for contacting.

8. A process according to claim 1, characterised in that the quantity of organometallic compound used in the prepolymerisation is such that the atomic ratio between the quantity of metal of the organometallic compound and the quantity of chromium of the catalyst is between 0.01 and 30.

* * * * *